(12) United States Patent
Li et al.

(10) Patent No.: US 6,697,383 B1
(45) Date of Patent: Feb. 24, 2004

(54) METHOD AND APPARATUS FOR DETECTING DATA STREAMS WITH SPECIFIC PATTERN

(75) Inventors: Yuan-Hwa Li, Taipei (TW); Mei-Chuan Lu, Taipei (TW); Yih-Sheng Wey, Taipei (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 0 days.

(21) Appl. No.: 09/258,655

(22) Filed: Feb. 26, 1999

(30) Foreign Application Priority Data

Jul. 28, 1998 (TW) ........................................ 87112315 A

(51) Int. Cl.[7] ................................................ H04J 3/06
(52) U.S. Cl. ........................ 370/510; 370/472; 709/223
(58) Field of Search ................................. 370/472, 473, 370/475, 514, 510, 470–471, 389, 476, 477, 474, 324, 350, 512, 522, 236–238, 503; 709/223–224, 236; 713/300, 310, 323

(56) References Cited

U.S. PATENT DOCUMENTS

| 5,305,321 A | 4/1994 | Crayford | 370/389 |
|---|---|---|---|
| 5,404,544 A | 4/1995 | Crayford | 713/310 |
| 5,938,771 A * | 8/1999 | Williams et al. | 713/323 |
| 6,098,100 A * | 8/2000 | Wey et al. | 370/472 |

OTHER PUBLICATIONS

Robert Sedgewick; "Algorithms in C"; Addison–Wesley Publishing Company; pp. 277–292.

* cited by examiner

*Primary Examiner*—Dang Ton
*Assistant Examiner*—Phuc Tran
(74) *Attorney, Agent, or Firm*—Merchant & Gould P.C.

(57) ABSTRACT

Magic Packet technique is developed to remotely awake a computer host in a sleeping mode on a node through computer network. Instead of utilizing a large amount of memory or a complex algorithm, an algorithm and system, which only utilize two sets of counters and control logics to perfectly detect the Magic Packet according to the characteristics of magic packet are disclosed. According to the present invention, if a LAN controller on a node of the network is in magic packet mode, it will detect all input frames addressed in the node to search a specific data sequence indicative of the Magic Packet frame. Once the controller detects the data sequence, it will notice the power management circuitry of the computer host on the sleeping node to awake the system.

16 Claims, 4 Drawing Sheets

METHOD AND APPARATUS FOR DETECTING DATA STREAMS WITH SPECIFIC PATTERN

BACKGROUND OF THE INVENTION

1. Field of the Invention

The present invention is related to a method and system for remotely awake the sleeping nodes on the communications network, and in particular, to a method and system for detecting specific type of data in the stream on the local area network (LAN).

2. Description of the Related Art

An Ethernet network which meets ANSI/IEEE 802.3 is usually used in a local area network, in which multiple computer nodes are connected to a single shared serial data path. Typically, only one node can transmit data onto the path at a time. A node connected to the path transmits data in the form of a packet that includes a destination address. The packet transmits through the network medium and is received by all other nodes. The addressed node duplicates the entire packet as it goes by; the others rejects the packet after determining that it is addressed to another node.

A Media Access controller (MAC) serves as an interface between a shared data path and the computer node connected to that path. Each node connected to the network includes a MAC that performs a number of functions involved in the transmission and reception of data packets. Further details on the Ethernet networks including the MAC is provided by Crayford, Advanced Micro Devices, U.S. application Ser. No. 07/841,113, filed on Feb. 24, 1992 and entitled, "Ethernet Media Access Controller with External Address Detection Interface and Associated Method," now U.S. Pat. No. 5,305,321, the disclosure of which is incorporated herein by reference.

ROC patent Pub. No. 225,073 (The corresponding U.S. Pat. No. is 5,404,544.), entitled "AUTO-WAKE FOR ETHERNET 10 BASED-T CONTROLLER," filed by Advanced Micro Devices (AMD) on Dec. 3, 1992 discloses such a system and method for automatic connection and disconnection of a node on a LAN by way of the power management of the LAN controller. Further, AMD also discloses a so-called Magic Packet technique for remotely waking up the sleeping computer host on a network. It is implemented by sending a specific information packet, Magic Packet, to a node on the computer network such that when a computer capable of receiving the specific packet goes to sleep, it enables the Magic Packet mode in the LAN controller, and the computer host 10 will alert the system to wake up while the LAN controller 15 receives a Magic Packet frame. The Magic Packet frame certainly meets the fundamental requirements of any one of the selected LAN techniques such as Ethernet and Token Ring, for example, SOURCE ADDRESS, DESTINATION ADDRESS (which may be an IEEE address of the receiving node or a MULTICAST address including BROADCAST address), and CRC(Cyclic Redundancy Check). The Magic Packet consists of sixteen duplications of consecutive specific sequence of the node's IEEE address of six bytes, without interruptions or breaks, wherein the specific sequence may be preceded by a synchronous stream and located anywhere within the Magic Packet. The synchronous stream is so designed that scanning state machine for the input status of the LAN controller 15 may be constructed much simpler. The synchronous stream is defined as a sequence of hexadecimal FFh having six bytes length.

In view of the above, the matching technique is actually a string searching technique. Since the network frame is a string of bytes, the Magic Packet matching is to search a specifically predefined data sequence within a string. A conventional string searching such as the book, entitled"Algorithm in C," 1990 Addison-Wisely, by Robert Sedgewick, which introduces a so-called Brute-Force and Kauth-Morris-Pratt (KMP) algorithm and Boyer-Moorse (BM) algorithm. The applicants, however, found that when applying to the Magic Packet matching, the above algorithms can not meet the requirements of detection time, size of memory, implementation complexity and difficulties in set-up.

In Brute-Force algorithm, the detecting process goes back while failing to search the target, which does not effectively utilize the information of the comparison history. Thus, the Brute-Force algorithm inevitably repeats its comparison process, fails to operate in real time and also needs to store the received bytes as an indication of the back-off search. According to the characteristics of the pattern to be compared, the KMP or BM algorithms both employ the properties of the comparison results. Further, prior to searching the string, these algorithms will set up in a real-time manner a look-up table in which the location of the byte to be compared while the current comparison fails indicated, thus inevitably increase the complexity thereof. To the contrary, the subject invention simplifies the searching algorithm according to the characteristics of the Magic Packet Pattern and dynamically constructs the registers for registering the back-off comparison condition, thus reduce the implementation complexity.

The comparison of the claimed algorithm of the present invention and the above-mentioned algorithms are tabulated for reference as follows:

TABLE 1

| | Brute-Force | KMP or BM | The Present Invention |
|---|---|---|---|
| Time Consuming | Long. The back-off comparison is needed when the comparison fails. If packet length is N, and length of the pattern to be compared is M, the most comparing times are M*N. | Short. Forward comparison need not to go back for comparison. The most comparing times are M + N. | Short. Forward comparison need not to go back for comparison. The most comparing times are N. |
| Storage Memory needed | A large amount thereof is needed. All the packet must be stored so as to effect the back-off comparison when the current comparison fails | A small amount thereof is needed. The compared bytes need not to be stored. | A small amount of memory id needed. The compared bytes need not to be stored. |
| Implementation Complexity | Simple. It may be implemented by some of counters, comparators, and so on. | Complex'it needs a microprogram to control the comparison process | Simple, which can be implemented by means of basic logical elements. |
| Difficulty of Set-up | Simple. It only needs to set the pattern to be compared. | Complex. It must set up the next table when the current comparison fails. | Simple. Only to set the pattern (node address) to be compared is needed, |

SUMMARY OF THE INVENTION

To avoid the above-mentioned problems encountered in the prior art, the present invention discloses an effectively operative method and system that utilizes only two sets of counter logics and the associated control logics to detect, in real time, the Magic Packet without utilizing a large amount of memory or complex algorithm.

According to the Magic Packet detecting system of the present invention, when a LAN controller of a node on the network receives the data streams addressed in the node, the detecting system of the present invention in which a Sync Counter and a Pattern Counter operates individually, starts to compare, on the byte basis, the input bytes within the streams and to determine whether or not any one of which matches the expected Magic Packet bytes. The Sync Counter continues to increase its count value as the received byte is a synchronous byte FFh until the count value equals to the number of the consecutive synchronous bytes preceding the Magic Packet pattern. (The count value need not equal to the byte length of synchronous bytes, since the physical address of a node probably includes synchronous bytes as well.) The Sync Counter clears the count value if the received byte is not a synchronous byte such that the number of the consecutive synchronous bytes may be counted. The Pattern Counter increases its count value as the input byte matches the Magic Packet bytes to be compared such that the exactly compared bytes are counted. If each of the input bytes does not match the expected byte and is a synchronous byte, meaning that the data streams including the received bytes encompass a consecutive sequence, the number of the consecutive synchronous bytes registered in the Sync Counter is loaded into the Pattern Counter for further computation of the number of the consecutive synchronous bytes. If the input byte is not a synchronous byte, the Sync Counter clears its count value to zero and then restart the byte comparison from the first byte of the input data streams.

When the Pattern Counter counts up to the byte length of the Magic Packet pattern (i.e. six synchronous bytes plus sixteen duplications of the physical address of 6 bytes), which means that the whole Magic Packet has already been detected, the packet detecting system of the present invention then sends a packet-detected signal to the computer management circuitry so as to awake the computer host.

Therefore, one object of the invention is to provide a method and system, which only utilizes two sets of counters and the associated control logical elements to perfectly detect the presence of Magic Packet within data streams in a network whereby waking up the computer host in a sleeping mode.

A further object of the invention is to provide a system and method, which only utilizes a simple algorithm to detect in real time the presence of a single or repeated specific data streams.

BRIEF DESCRIPTION OF THE DRAWINGS

The invention will become more fully understood from the detailed description given hereinbelow and the accompanying drawings, which are given by way of illustration only, and thus are not imitative of the present invention, wherein.

DETAILED DESCRIPTION OF THE INVENTION

Figure 1:
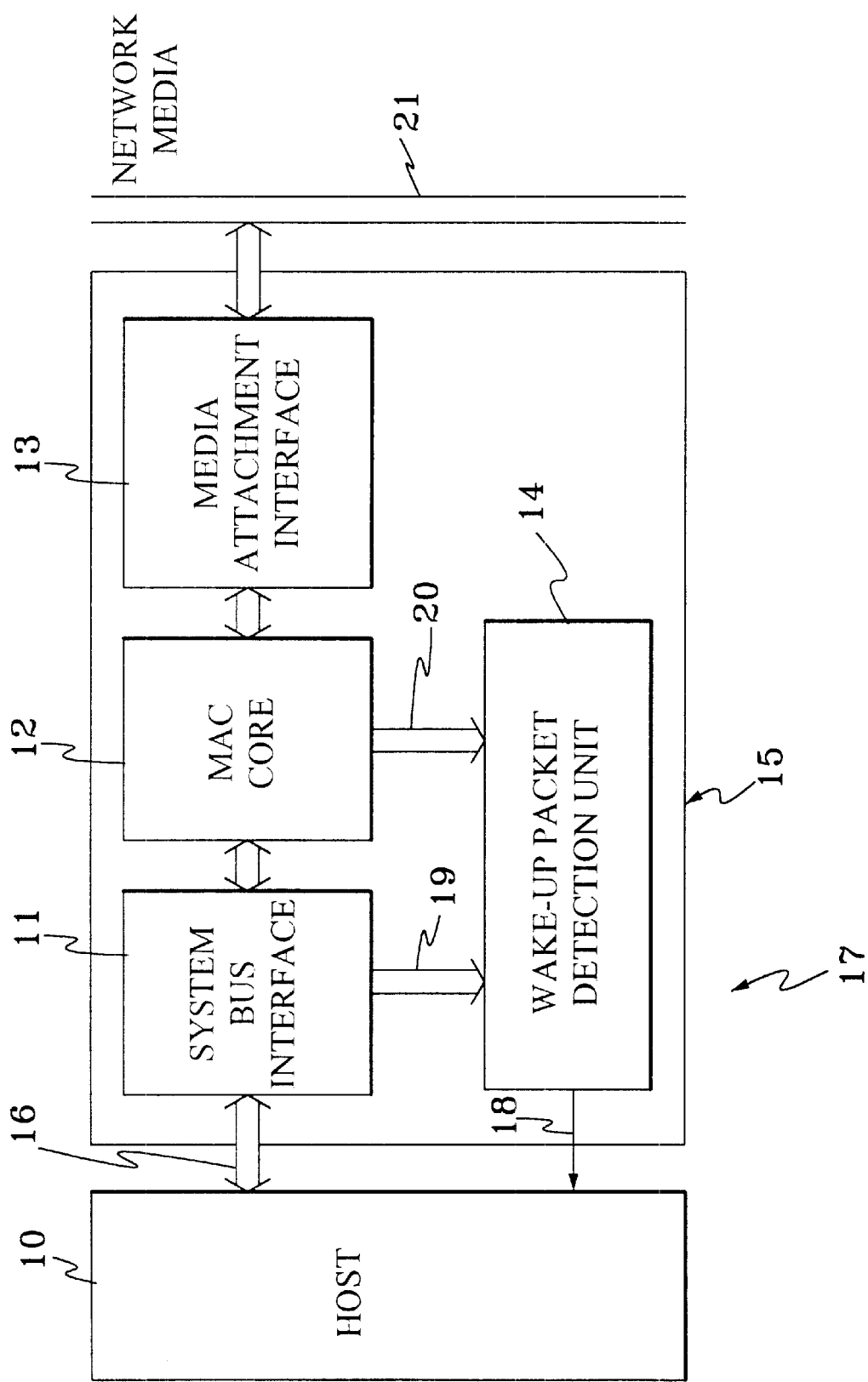
FIG. 1 is a block diagram of the wake-up packet detecting means used for Ethernet Network according to the present invention.

Referring to FIG. 1, Medium Access Controller (MAC) core 13 is an interface of Ethernet data processing network and controls the communication between serial network medium 21 and system bus interface 11. MAC core 13 further includes a station address detection (SAD) unit (not shown), which determines whether the packet received by MAC core 13 is addressed in the node which the computer host 10 locates to. The network medium 21 may be an optical fiber, coaxial cable or twisted pairs, and medium attachment interface 13 transfers the packet via the above-mentioned medium over the network medium 21 to the information accessible by MAC core 13. Further information about Ethernet network processing network and MAC core 13, such as U.S. Ser. No. 07/841,113, filed by Crayford on Feb. 24, 1992 is incorporated herein by reference.

Recently, in order to develop remote wake-up techniques for a LAN, Advanced Micro Devices first proposed a so-called Magic Packet technique, the method of which sends a specific information packet, Magic Packet, to a sleeping node on the network such that when a computer capable of receiving the specific packet is in a sleeping mode, the LAN controller of the computer will be in a Magic Packet mode, and the computer host 10 will be awaked while the LAN controller 15 receives a Magic Packet frame. The Magic Packet frame certainly meets the fundamental requirements of any one of the selected LAN techniques such as Ethernet and Token Ring, for example, SOURCE ADDRESS, DESTINATION ADDRESS (which may be an IEEE address of the receiving node or a MULTICAST address including BROADCAST address), and CRC. (Cyclic Redundancy Check) The Magic Packet consists of sixteen duplications of the consecutive specific sequence of the node's IEEE address of six bytes, wherein the specific sequence may be preceded by a synchronous stream and located anywhere within the Magic Packet. The synchronous streams is so designed that scanning means for the input status of the LAN controller 15 may be constructed simply. The synchronous stream is defined as a sequence of hexadecimal FFh having six bytes length. The LAN controller also receives a broadcast frame as long as the sixteen bytes of IEEE address in the frame match the physical address of the node to be woke up. Here, it assumes that an Ethernet network frame propagates throughout the network medium 21 and the IEEE address of the addressed node is 11h 22h 33h 44h 55h 66h (hexadecimal), any data sequence meeting the format of DESTINATION ADDRESS SOURCE ADDRESS MISC FF FF FF FF FF 112233445566 112233445566*112233445566 MISC CRC will be accessible by the LAN controller 15.

In addition to the above description, no further limitation to the Magic Packet is required, such as that the sequence may be located in a TCP/IP packet, IPX packet and so on.

Basically, the detection of Magic Packet is directed to a string searching technique while the network frame is of byte strings. The purpose of the present invention lies in searching a specific data sequence in a string. This will lead to a direct but wrong algorithm (hereinafter referred to as Direct Method), such as:

```
m=1
magic_packet_match=FALSE ;
for n=1 to length (network_frame)
begin
if network_frame[n]==magic_packet_pattern[m] then
m=m+1 ;
else
m=1 ;
if m==length (magic_packet_pattern)+1 then magic_packet_match=
TRUE ;
end
```

Take the above-mentioned address for example, the Direct Method is operated as follows:

```
DA:      11  22  33  44  55  66
Input:   FF  FF  FF  FF  FF  FF  FF      11        22        33      44  55  66  11  22
Pattern: FF  FF  FF  FF  FF  FF  11      <fail>
                                         FF        <fail>
                                                   FF        <fail>
```

Obviously, Direct Method will miss one valid Magic Packet.
Another Example is given as follows:

```
DA:      11  22  FF  FF  55  66
Input:   FF  FF  FF  FF  FF  FF  11  22  FF  FF  FF    FF       FF  FF    11      22  FF  FF  55 ...
Pattern: FF  FF  FF  FF  FF  FF  11  22  FF  FF  55    <fail>
                                                       FF       FF  FF    <fail>
```

Here, again this method also misses another valid Magic Packet for the reason that the fail but partly matched string includes another valid pattern "FF FF".

In the above-mentioned KMP algorithm, the next table should be established before the comparison by sliding a copy of the first m pattern bytes over itself in a byte basis wherein m is the byte number before mismatch occurs, and the next byte to be back-off is the maximum number of the overlapping bytes. Fortunately, the magic packet pattern always proceeds with FFh (especially six consecutive FFs). Only one possible situation that the sliding pattern may match itself is when the input byte is FF. In addition, Direct Method will fail when the Input is FF while the pattern byte to be compared is not FF.

Consider the first example, valid pattern is exactly positioned from the second FF. Since Input has alreadyreceived six FFs before receiving 11, the next pattern byte to be compared is 11. For thesecond example, since Input has already received three FFs before receiving the next FF, the next pattern byte to be compared is FF. One conclusion made from the above two examples is that consecutive FFs may reveal the next pattern byte to be compared.

Therefore, to resolve the drawbacks encountered in the above prior art, the algorithm according to the present invention is given as follows:

```
m=1 ;
magic_packet_match=FALSE ;
for n=1 to length (network_frame)
begin
if network_frame[n]==magic_packet_pattern[m] then
m=m+1 ;
else
if network_frame[n]==0x FF then
m=min { no. of consecutive 0xFF in magic_packet_pattern ;
        no. of consecutive 0xFF in network_frame} ;
else
m=1 ;
end
if m==length (magic_packet_pattern)+1 then magic_packet_match=
TRUE ;
end
OR
    s=0;
    m=0;
    magic_packet_match=FALSE;
    for n=0 to length(network_frame)-1
    begin
```

-continued

```
/*** sync counter operation ***/
    if network frame [n]==0xFF then
        s=min(s+1, no. of consecutive 0xFF in magic packet
    pattern);
    else
        s=0;
/*** pattern counter operation ***/
    if network_frame [n]==magic_packet_patterm[m] then
        m=m+1;
    else
    if network_frame [n]==0xFF then
        m=s;
    else
        m=0;
    end
    if m==length (magic_packet_pattern) then
magic_packet_match=TURE;
    end
```

Figure 2:
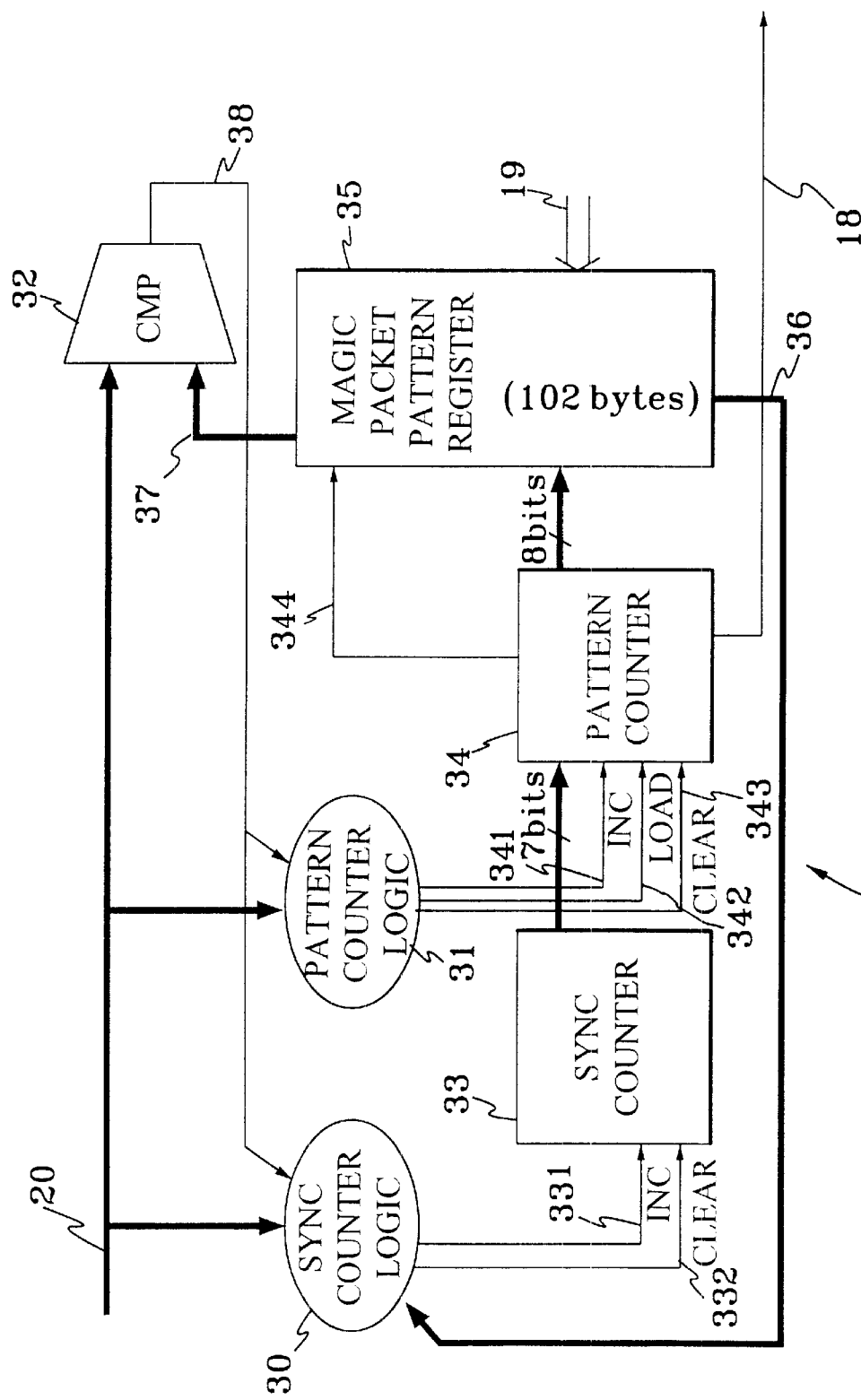
FIG. 2 is a simplified block diagram of the wake-up detecting means of FIG. 1.

Based on the above discussion, now referring to FIG. 2, according to a preferred embodiment of the present invention, wake-up packet detecting unit 14 only needs two sets of counters and the associated control logics to effectively implement Magic Packet matching. The Magic Packet register 35 may be a single register capable of storing 102 bytes. The first counter (sync counter, ff-cntr) 33 records the number of the consecutive synchronous bytes within the input streams which have already been compared, which implies that when the current comparison fails, whether a segment of data streams that match the pattern are embedded in the failure-compared (partly successful) input streams as an indication of back-off searching. The second counter (pattern counter, cntr) 34 records the current status in matching, i.e., the locations of the matched bytes within Magic Packet pattern and provides Magic Packet Register 35 with the location of next byte to be compared such that Magic Packet Register 35 may selectively output the bytes to be compared, probably either the address bytes or the synchronous bytes FFs, to the comparator 32. The comparator 32 is designed to compare the input bytes within the data streams received from network medium 21 with the Magic Packet bytes to be compared. Counter Control Logics 30 and 31 are designed to control the operation of the counters to implement the claimed comparison algorithm of the present invention according to the input information, the comparison status of as well as the comparison results of the counters so as to perfectly detect the Magic Packet in the network medium.

Referring to FIG. 1, network means 17 receives the data streams addressed therein via a interface 13. MAC core 12 then retrieves the data streams and sends them via bus 20 to wake-up packet detecting unit 14. Now referring to FIG. 3, which depicts a more detailed circuit diagram of the embodiment according to FIG. 2, prior to receiving the data streams, the sync counter 33 and pattern counter 34 unit 14 both clear their count value to zero. As mentioned above, the Magic Packet register 35 may be a single register capable of storing 102 bytes or be implemented by means of MAC Address Register 351, multi-plexer 352 and Magic Packet length register 353 for the sake of reducing the amount of memory and the manufacture costs. MAC Address Register 351 stores the physical address of the network means 17 or the Medium Access Control Address. System bus interface 11 sends the physical address of the network means 17 through bus 19 to MAC Address Register 351. It is assumed that the input data streams (INPUT) are shown in example 1 and the physical address thereof (DA) is 11 22 33 44 55 66 (H).

FIRST EXAMPLE

| DA: | 11 | 22 | 33 | 44 | 55 | 66 | | | | | | | | |
|---|---|---|---|---|---|---|---|---|---|---|---|---|---|---|
| Input: | FF | FF | FF | FF | FF | FF | FF | 11 | 22 | 33 | 44 | 55 | 66 | 11 ... |
| sync | 0 | 0 | 0 | 0 | 0 | 0 | 1 | 1 | 1 | 1 | 1 | 1 | 1 | 1 |
| da-cntr | 0 | 0 | 0 | 0 | 0 | 0 | 0 | 0 | 0 | 0 | 0 | 0 | 0 | 1 |
| byte-cntr | 0 | 1 | 2 | 3 | 4 | 5 | 0 | 0 | 1 | 2 | 3 | 4 | 5 | 0 |
| ff-sync | 0 | 0 | 0 | 0 | 0 | 0 | 1 | 1 | 0 | 0 | 0 | 0 | 0 | 0 |
| ff-byte-cntr | 0 | 1 | 2 | 3 | 4 | 5 | 0 | 0 | 0 | 0 | 0 | 0 | 0 | 0 |
| m: | 0 | 1 | 2 | 3 | 4 | 5 | 6 | 6 | 7 | 8 | 9 | 10 | 11 | 12 |
| s: | 0 | 1 | 2 | 3 | 4 | 5 | 6 | 6 | 0 | 0 | 0 | 0 | 0 | 0 |

Figure 3:
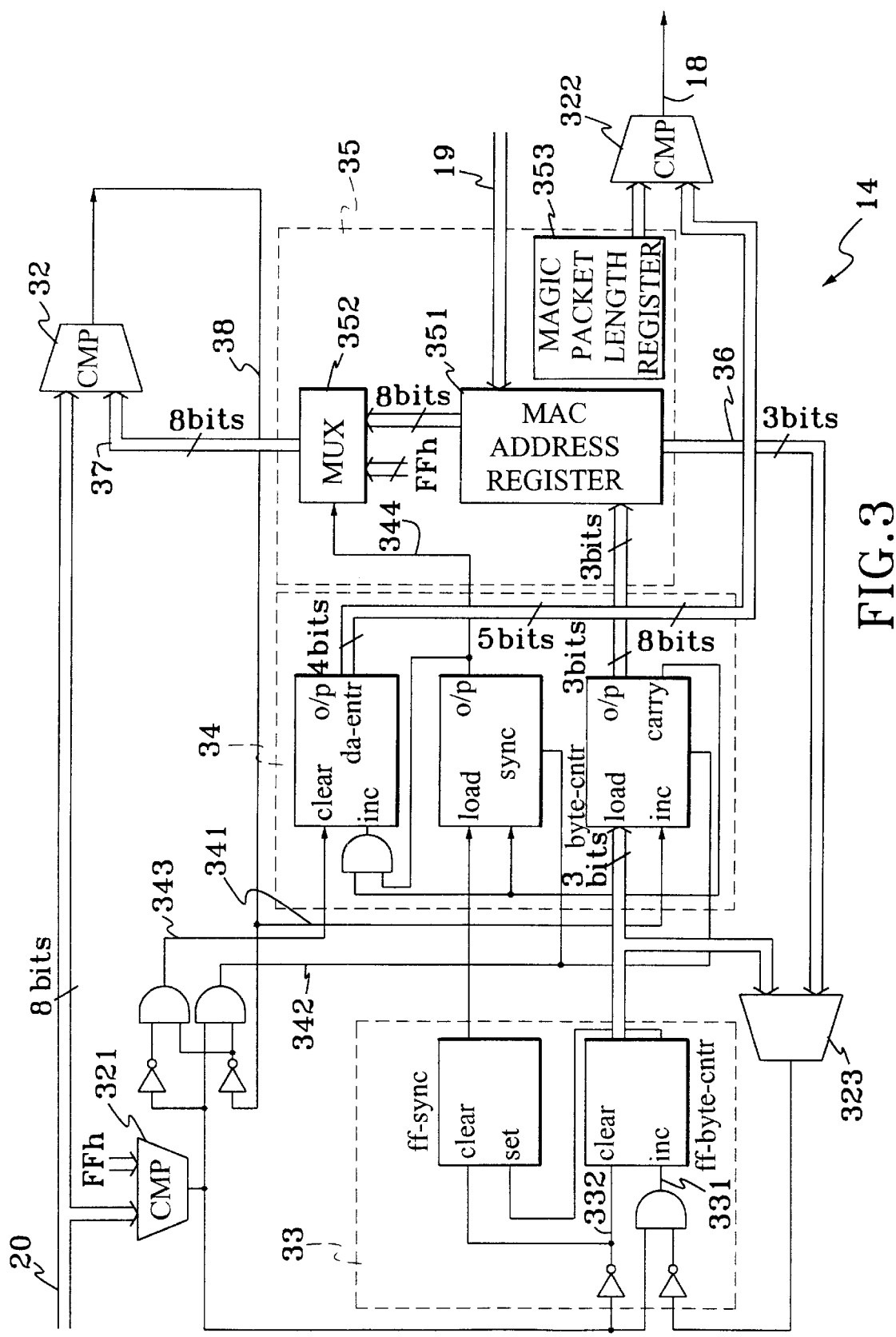
FIG. 3 is a detailed block diagram of the wake-up detecting means of FIG. 2 according to a preferred embodiment of the present invention.

Referring to FIG. 3, first counter 33 (sync counter, ff-cntr) records the number of consecutive synchronous bytes, FFh, within the input stream which has been compared, implying that when the current comparison fails, whether a segment of data streams which can match the pattern are embedded in the failure-compared (partly successful) input streams as an indication of back-off searching. The second counter (pattern counter, cntr) 34 records the current status in matching, i.e., the locations of the matched bytes within Magic Packet pattern, and provides MAC Address Register 351 with the location of next byte to be compared such that MAC Address Register 351 may output the bytes to be compared, to the multi-plexer 352. The other input to the multi-plexer 352 is eight bits of hexadecimal FFh. Output 344 of the first counter 34 serves as a selection line of the multi-plexer 352 for selectively outputting FFh or the byte to be compared in the MAC Address Register 352 to comparator 32. FF counter 33 mainly includes ff-sync counter and ff-byte counter, and pattern counter 34 mainly includes da-counter, sync counter and byte counter. The output of byte-cntr[3:0] represents the number of the input bytes that match synchronous bytes or any one byte within physical address (DA) of the network means. The output of the sync counter, either logical "0" or "1", indicates that the currently input byte is a byte within the synchronous streams or within the physical address (DA), respectively. The output of da-cntr [3:0] represents the number of the input bytes that match the bytes with the physical address. Take first example for example. The initial values of the counters are all set to zero and the six consecutive input bytes of FFs enable byte-counter and ff-byte counter simultaneously up-count their count values from 0 to 5, which enables the sync counter and ff-sync counter carrying to 1 at the rising edge of the next clock, thus changing the transient output 37 of multiplexer 352 from FFh to the bytes within the physical address (DA). The output O/P of the byte counter controls MAC Address Register 351 to output the nth byte of the physical address (DA) (n=1~6) to multiplexer 352. The other output 36 of MAC Address Register 351 reveals the number of the consecutive FFs within the input data streams. Because the seventh input byte is FFh, the output 38 of comparator 32 remains logical low, thereby activating the pin "Pattern Counter Load" 342 of the counter logic 31 to enable the respective output (O/P) of the ff-sync counter and the ff-byte counter in FF Counter Set 33 being loaded into the corresponding counter in Pattern Counter Set 34. Referring to the first example, therefore, while the seventh input byte is FFh, ff-sync counter and ff-byte counter load their count value into sync counter and byte-counter, respectively, at the rising edge of the next clock at which the input byte is 11h.

Then, comparator 323 compares the output (O/P) of the ff-byte counter, "0" (decimal) or "000" (binary) and the output 36 of MAC Address Register 351, "6" (decimal) or "110" (binary) for the first example and outputs a logical high digital signal, and which logically operates with the output of comparator 323, logical "1," by a logical element to form a low voltage disable signal at pin ff-cntr-inc 331. Therefore, when the seventh byte of the input streams is still FFh, the current count values of the ff-sync counter and the ff-byte counter will remain at the rising edge of the next clock, at which the input byte is 11h. Further, when the input byte is 11h, the voltage output of comparator 321 is logical low at the rising edge of the next clock, at which the input byte is 22h, activating the pin 332 "clear" of the counters in FF counter 33 to clear the count values of all the counters to zero. At the same time, the byte counter outputs logical "0" at the output (O/P) thereof, thereby enabling MAC Address Register 351 to output the first byte of the physical address DA, "11h", to the multi-plexer 352, and the sync counter outputs logical "1" at the output (O/P) thereof, thereby enabling the multi-plexer 352 to send "11h" to the comparator 32. Since the input bytes following "11h" represent the physical address of the network means, the comparator 321 surely outputs logical "0", thus activating pin 332 of the ff-byte counter to continuously clear the count values of the ff-sync counter and ff-byte counter to zero at the corresponding clocks. The byte counter continues to up-count until all the bytes within the physical address DA are matched and then the da-counter counts its value to 1. Similarly, when the sixteen duplications of the consecutive DA bytes are fully detected, the sync-counter outputs "1" at its O/P pin, the da-counter outputs "15" ("1111") at its O/P pin, and the byte-counter outputs "5" ("101"). The summation of all the outputs of them forms a digital signal of eight bits in comparator 322 to be in comparison with the pattern length of the Magic Packet frame stored in Pattern Length Register 353. If they are perfectly matched, comparator 322 sends a "Magic-Packet-detected" signal 18 of logical high voltage to the computer host 10, re-boosting the power to awake the computer host 10. As known by persons skilled in the art, the functionality of the comparator 322 may be incorporated into the CARRY logic of the Pattern Counter 35 or into the circuity, such as the pointer added in address 102, which is next to the address at which the read-out of Magic Packet Pattern stops, for indicating out-of-range of the pointer of the Magic Packet Register 35.

Another case is given as follows:

SECOND EXAMPLE rently compared byte of the received data packet matches the expected data addressed by the count value of the Pattern Counter 34 and also is a synchronous byte (step 47): if no, clearing the count value of the FF Counter 33 (step 48); if yes, further deciding whether the FF Counter 33 receives the largest number of the synchronous bytes (step 55). The subject invention iterates the above process continuously until the six synchronous bytes of FFs and sixteen duplications of the physical address are fully detected in the received packet (step 49), and immediately sends a packet-detected signal to the computer host 10 to awake the network

| DA: | 11 | 22 | FF | FF | 55 | 66 | | | | | | | | | | | | | | | |
|---|---|---|---|---|---|---|---|---|---|---|---|---|---|---|---|---|---|---|---|---|---|
| Input: | FF | FF | FF | FF | FF | FF | 11 | 22 | FF | FF | FF | FF | FF | FF | 11 | 22 | FF | FF | 55 | 66 | 11 ... |
| Sync | 0 | 0 | 0 | 0 | 0 | 0 | 1 | 1 | 1 | 1 | 1 | 0 | 0 | 0 | 1 | 1 | 1 | 1 | 1 | 1 | 1 |
| da-cntr | 0 | 0 | 0 | 0 | 0 | 0 | 0 | 0 | 0 | 0 | 0 | 0 | 0 | 0 | 0 | 0 | 0 | 0 | 0 | 0 | 1 |
| byte-cntr | 0 | 1 | 2 | 3 | 4 | 5 | 0 | 1 | 2 | 3 | 4 | 3 | 4 | 5 | 0 | 1 | 2 | 3 | 4 | 5 | 0 |
| ff-sync | 0 | 0 | 0 | 0 | 0 | 0 | 1 | 0 | 0 | 0 | 0 | 0 | 0 | 0 | 1 | 0 | 0 | 0 | 0 | 0 | 0 |
| ff-byte-cntr | 0 | 1 | 2 | 3 | 4 | 5 | 0 | 0 | 0 | 1 | 2 | 3 | 4 | 5 | 0 | 0 | 0 | 1 | 2 | 0 | 0 |
| m: | 0 | 1 | 2 | 3 | 4 | 5 | 6 | 7 | 8 | 9 | 10 | 3 | 4 | 5 | 6 | 7 | 8 | 9 | 10 | 11 | 12 |
| s: | 0 | 1 | 2 | 3 | 4 | 5 | 6 | 0 | 0 | 1 | 2 | 3 | 4 | 5 | 6 | 0 | 0 | 1 | 2 | 0 | 0 |

Similarly, referring to FIG. 3, the input bytes consisting of consecutive six FFs cause sync counter and ff-sync counter both concurrently carry to 1. The following four input bytes "11 22 FF FF" enable the byte counter up-counting its count value to 4 and the count values of the sync counter remained all in 1 for the consecutive four clocks right after the next one clock. It means that all of the current input bytes match the physical address bytes. The input bytes "11 22" force the ff-byte counter and ff-sync counter clearing their count values to zero. The fact that input byte "FF" following "11 22 FF FF" does not match the corresponding byte "55" of the physical address DA actuates the pin "cntr-load" to load the count values of FF counter 33 into the Pattern Counter 34.

The consecutive four FFs following "11 22 FF FF" enable the ff-byte counter up-counting to 5 and carrying 1 to the ff-sync counter. While in response to the count value of the sync counter being 1, the byte counter up-counts its value according to the input byte "FF" and carries 1 to the sync counter when counting to the sixth FF byte.

In view of the above two examples, according to the preferred embodiment of the present invention, even though the physical address DA in the received data stream is preceded by or encompasses a part of the synchronous bytes, the wake-up packet detecting unit 14 still can effectively detect the Magic Packet and then awake the computer host 10.

Figure 4:
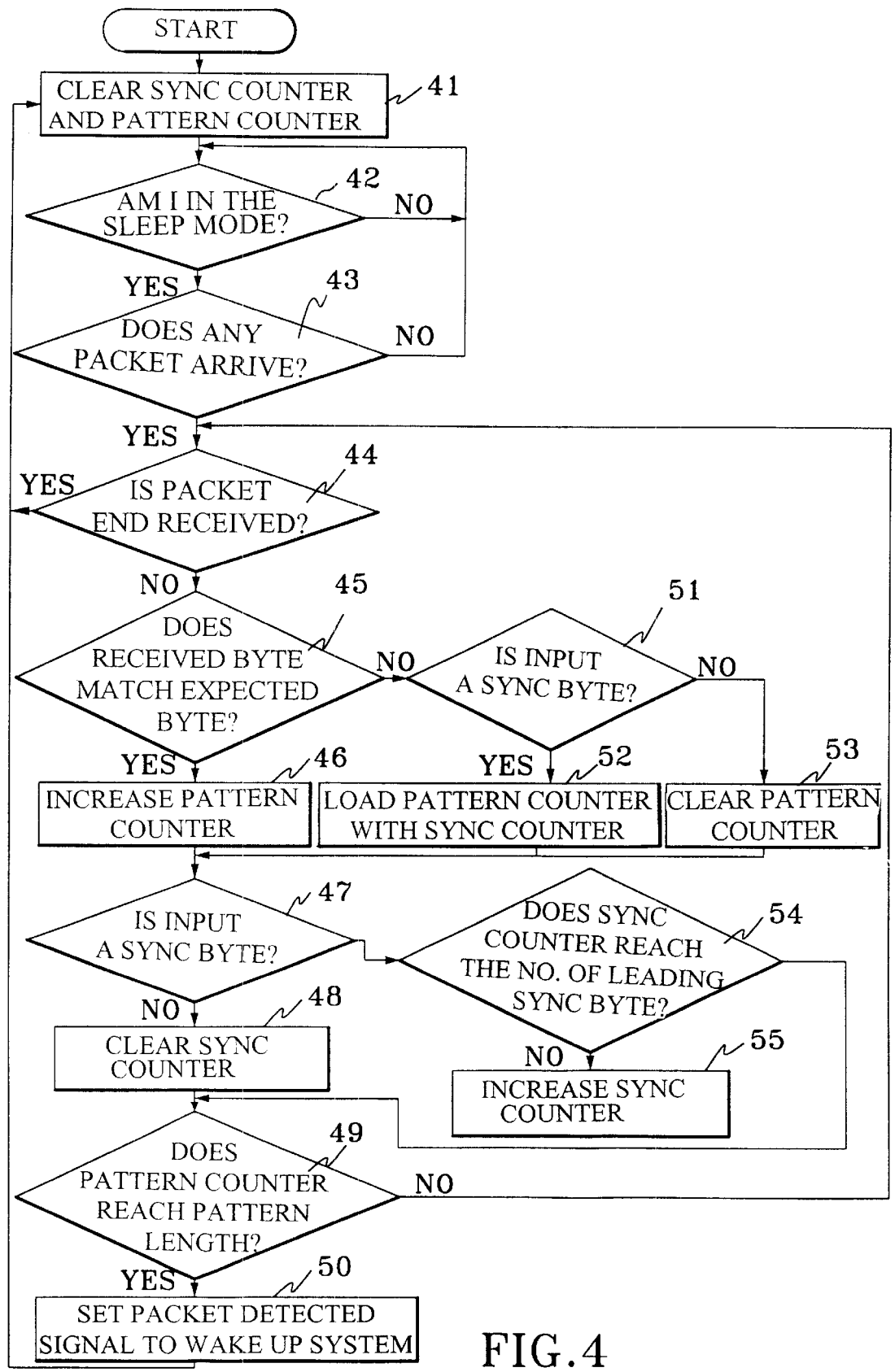
FIG. 4 is a detecting flow chart of the wake-up detecting means of the present invention

Referring to FIG. 4, which depicts the operating flow of the wake-up packet detecting unit 14 according to the present invention, first, at step 41, all the values of the counters in unit 14 are clear to 0. Second, whether the network means 17 goes to sleep is detected at step 42. Any data packet addressed in means 17 reaches means 17 via network medium 21 (step 43) and are received by MAC core 12 (step 44). On receiving the data packet, if the input bytes within the data packet match the expected data addressed by the count values .of the Pattern Counter 34, on the byte basis (step 45), then the Pattern Counter increases its count value (step 46). Otherwise, to decide whether the current input byte within the received data packet is a synchronous byte (step 51). If affirmative, loading the count values of the FF Counter 33 into the Pattern Counter 34. If negative, resetting the patent counter (step 53). In deciding whether the curmeans 17. Although the preferred embodiment according to the subject invention as shown in FIGS. 3 and 4 is implemented by way of hardwares, it can also function through the computer software stored in memories. The exemplary programs mentioned above may be well understood by persons skilled in the art in connection with FIG. 4.

In particular, any applications for specific functions employing a specific data stream in the field of wireless communication or computer network may be implemented according to the above descriptions and the illustration thereof.

Although the invention has been disclosed in terms of a preferred embodiment, the disclosure is not intended to limit the invention. The invention still can be modified, varied by persons skilled in the art without departing from the scope and spirit of the appended claims of the invention.

What is claimed is:

1. An apparatus for detecting a data stream having a specific pattern, said pattern including a fixed length of a synchronous byte and a plurality of address bytes, said apparatus comprising:

a pattern register means for registering said pattern;

comparator means, coupled to said data stream and to said pattern register means, for comparing, on a byte basis, each of input bytes from said data stream with a byte from said pattern register means to decide a match with the specific pattern;

a second register, coupled to said data stream, said comparator means, and a first register, for registering locations of the compared bytes, and loading a location of the byte to be compared into said pattern register means such that said pattern register means outputs a byte to be compared to said comparator means for executing an operation of a new, resumption or back-off comparison;

the first register, coupled to said data, stream and said comparator means, for registering a number of consecutive synchronous bytes within the compared bytes of said data stream and a location of the byte to be traced back when the comparison is false;

a first control logical means, coupled to said data stream, said comparator means, and the first register, for operating an increment or clear of a count value of the first register, in response to the input byte from said data stream equalling a synchronous byte;

a second control logical means, coupled to said data stream, said comparator means, and the second register, for increasing, clearing or loading the count value of the first register, in response to an output of said comparator means and the input byte; and a decision means for deciding whether the comparison of the pattern and the data stream, on the byte basis, is complete and outputting an enable signal to an external system, whereby the loading operation of the second control logical means enables the second register to load the number of the synchronous bytes registered therein into the second register, and when the input byte is a synchronous byte, the first register executes the increase operation until the number of synchronous bytes registered therein equals to the number of the consecutive synchronous bytes within the pattern.

2. The apparatus as claimed in claim 1, wherein said first register comprises two up-counters used for synchronous byte, and the second register comprises three up-counters used for address byte, and outputs of the two up-counters used for synchronous byte are loaded into two of the three up-counters used for address byte, in response to the load signal of the second control logical means, and wherein the pattern register means further comprises:

an address register for registering the address bytes;

a pattern length register for registering the number of the bytes within the pattern;

a multiplexer for selectively outputting the synchronous byte or the output byte from the address register as a byte to be compared to the comparator means.

3. The apparatus as claimed in claim 2, wherein said decision means is a comparator, and an output of the third up-counter used for the address byte is sent in parallel to the comparator, and the comparator sends an enable signal to an external system in response to the number of address bytes from the output of the third up-counter used for address byte equalling to the number of the bytes of the pattern within the pattern length register.

4. The apparatus as claimed in claim 3, wherein the external system in its sleeping mode wakes up in response to the enable signal.

5. The apparatus as claimed in claim 2, wherein the external system in its sleeping mode wakes up in response to the enable signal.

6. The apparatus as claimed in claim 1, wherein said pattern consists of six consecutive synchronous bytes and sixteen duplications of the address bytes.

7. The apparatus as claimed in claim 1, wherein said decision means is a CARRY logic of the second register, which sends an enable signal to the external system in response to the number of the address bytes registered in the second register equalling to the number of address bytes in the pattern.

8. The apparatus as claimed in claim 7, wherein the external system in its sleeping mode wakes up in response to the enable signal.

9. The apparatus as claimed in claim 1, wherein said decision means is a pointer of the pattern register means, which sends an enable signal to the external system in response to a value of a pointer equalling to the number of bytes in the pattern.

10. The apparatus as claimed in claim 1, wherein the external system in its sleeping mode wakes up in response to the enable signal.

11. A computer network connection controller including a medium access controller core with a sleeping mode, a system bus interface and means for detecting a wake-up pattern, wherein the medium access controller core controls the communication between the system bus interface and a network medium, the system bus interface communicates with a computer host, and the means for detecting a wake-up pattern comprises an apparatus for detecting a data stream having a specific pattern, including:

a pattern register means for registering said pattern;

comparator means, coupled to said data stream and to said pattern register means, for comparing, on a byte basis, each of input bytes from said data stream with a byte from said pattern register means to decide a match with the specific pattern;

a second register, coupled to said data stream, said comparator means, and a first register, for registering locations of the compared bytes, and loading a location of the byte to be compared into said pattern register means such that said pattern register means outputs a byte to be compared to said comparator means for executing an operation of a new, resumption or back-off comparison;

the first register, coupled to said data stream and said comparator means, for registering a number of consecutive synchronous bytes within the compared bytes of said data stream and a location of the byte to be traced back when the comparison is false;

a first control logical means, coupled to said data stream, said comparator means, and the first register, for operating an increment or clear of a count value of the first register, in response to the input byte from said data stream equalling a synchronous byte;

a second control logical means, coupled to said data stream, said comparator means, and the second register, for increasing, clearing or loading the count value of the first register, in response to an output of said comparator means and the input byte; and a decision means for deciding whether the comparison of the pattern and the data stream, on the byte basis, is complete and outputting an enable signal to an external system, whereby the loading operation of the second control logical means enables the second register to load the number of the synchronous bytes registered therein into the second register, and when the input byte is a synchronous byte, the first register executes the increase operation until the number of synchronous bytes registered therein equals to the number of the consecutive synchronous bytes within the pattern, and whereby the means for detecting a wake-up pattern receives data streams, addressed in the computer host, transmitted by the medium access controller core and a physical network address of the computer host transmitted by the system bus interface, and sends an enable signal to awake the computer host in a sleeping mode.

12. A method for detecting data stream with a specific pattern, said pattern including a stream of synchronous bytes of fixed length and a plurality of consecutive address bytes, said method comprising the steps of:

(a) receiving said data stream;

(b) comparing received bytes from said data stream with the synchronous byte and the address byte to be compared, which is determined by a register for registering the comparison condition;

(c) varying count values of the register to enable a re-comparison, continuous comparison or back-off comparison of the register, in response to the comparison condition of step (b);

(d) comparing the received byte with the synchronous byte and in response to a comparison result, varying the count values of the register for registering the back-off condition as an indication of the back-off comparison of the register; and (e) determining whether the data stream matches the pattern, on the byte basis, to send a pattern-detected signal to an external system.

13. The method as claimed in claim 12, wherein step (c) further comprising the steps of:

(c1) if received bytes from said data stream matches the byte to be compared, increasing by one the count value of the register for registering a comparison condition;

(c2) if the received byte matches the synchronous byte rather than the byte to be compared, loading a number of the received bytes, registered in the register for registering a back-off condition, into the register for registering the comparison condition for effecting the back-off comparison;

(c3) if the received byte does not match both of the byte to be compared and the synchronous byte, clearing values stored in the register for registering the comparison condition to zero and effect a re-comparison from the beginning of the fixed length of synchronous bytes.

14. The method as claimed in claim 12, wherein step (d) further comprising the steps of:

(d1) storing a number of consecutive synchronous bytes within the received bytes matching from said data stream, on the byte basis, the pattern to be compared in the register for registering the back-off condition;

(d2) if the received byte matches the synchronous byte and value stored in the register for registering the back-off condition is less than the synchronous bytes preceding the pattern to be compared within the data stream, increasing by one count value of the register for registering the back-off condition;

(d3) if the received byte does not match the synchronous byte, clearing count values of the register for registering the back-off condition.

15. A computer network connection controller including a medium access controller core with a sleeping mode, a system bus interface and means for detecting a wake-up pattern, wherein the medium access controller core controls the communication between the system bus interface and a network medium, the system bus interface communicates with a computer host, and the means for detecting a wake-up pattern comprises an apparatus including:

a pattern register means for registering said pattern;

comparator means, coupled to said data stream and to said pattern register means, for comparing, on a byte basis, each of input bytes from said data stream with a byte from said pattern register means to decide a match with the specific pattern;

a second register, coupled to said data stream, said comparator means, and a first register, for registering locations of the compared bytes, and loading a location of the byte to be compared into said pattern register means such that said pattern register means outputs a byte to be compared to said comparator means for executing an operation of a new, resumption or back-off comparison;

the first register, coupled to said data stream and said comparator means, for registering a number of consecutive synchronous bytes within the compared bytes of said data stream and a location of the byte to be traced back when the comparison is false, wherein said first register comprises two up-counters used for synchronous byte, and the second register comprises three up-counters used for address byte, and outputs of the two up-counters used for synchronous byte are loaded into two of the three up-counters used for address byte, in response to the load signal of the second control logical means, and wherein the pattern register means further comprises:

an address register for registering the address bytes;

a pattern length resister for registering the number of the bytes within the pattern; and a multiplexer for selectively outputting the synchronous byte or the output byte from the address register as a byte to be compared to the comparator means;

a first control logical means, coupled to said data stream, said comparator means, and the first register, for operating an increment or clear of a count value of the first register, in response to the input byte from said data stream equalling a synchronous byte;

a second control logical means, coupled to said data stream, said comparator means, and the second register, for increasing, clearing or loading the count value of the first register, in response to an output of said comparator means and the input byte; and a decision means for deciding whether the comparison of the pattern and the data stream, on the byte basis, is complete and outputting an enable signal to an external system, wherein said decision means is a comparator, and an output of the third up-counter used for the address byte is sent in parallel to the comparator, and the comparator sends an enable signal to an external system in response to the number of address bytes from the output of the third up-counter used for address byte equalling to the number of the bytes of the pattern within the pattern length register, whereby the loading operation of the second control logical means enables the second register to load the number of the synchronous bytes registered therein into the second register, and when the input byte is a synchronous byte, the first register executes the increase operation until the number of synchronous bytes registered therein equals to the number of the consecutive synchronous bytes within the pattern and whereby the means for detecting a wake-up pattern receives data streams, addressed in the computer host, transmitted by the medium access controller core and a physical network address of the computer host transmitted by the system bus interface, and sends an enable signal to awake the computer host in a sleeping mode.

16. A computer network connection controller including a medium access controller core with a sleeping mode, a system bus interface and means for detecting a wake-up pattern, wherein the medium access controller core controls the communication between the system bus interface and a network medium, the system bus interface communicates with a computer host, and the means for detecting a wake-up pattern comprises an apparatus including:

a pattern register means for registering said pattern;

comparator means, coupled to said data stream and to said pattern register means, for comparing, on a byte basis, each of input bytes from said data stream with a byte from said pattern register means to decide a match with the specific pattern;

a second register, coupled to said data stream, said comparator means, and a first register, for registering locations of the compared bytes, and loading a location of the byte to be compared into said pattern register means such that said pattern register means outputs a byte to be compared to said comparator means for executing an operation of a new, resumption or back-off comparison;

the first register, coupled to said data stream and said comparator means, for registering a number of consecutive synchronous bytes within the compared bytes of said data stream and a location of the byte to be traced back when the comparison is false;

a first control logical means, coupled to said data stream, said comparator means, and the first register, for operating an increment or clear of a count value of the first register, in response to the input byte from said data stream equalling a synchronous byte;

a second control logical means, coupled to said data stream, said comparator means, and the second register, for increasing, clearing or loading the count value of the first register, in response to an output of said comparator means and the input byte; and a decision means for deciding whether the comparison of the pattern and the data stream, on the byte basis, is complete and outputting an enable signal to an external system, wherein said decision means is a CARRY logic of the second register, which sends an enable signal to the external system in response to the number of the address bytes registered in the second register equalling to the number of address bytes in the pattern;

whereby the loading operation of the second control logical means enables the second register to load the number of the synchronous bytes registered therein into the second register, and when the input byte is a synchronous byte, the first register executes the increase operation until the number of synchronous bytes registered therein equals to the number of the consecutive synchronous bytes within the pattern and whereby the means for detecting a wake-up pattern receives data streams, addressed in the computer host, transmitted by the medium access controller core and a physical network address of the computer host transmitted by the system bus interface, and sends an enable signal to awake the computer host in a sleeping mode.

* * * * *